No. 653,331. Patented July 10, 1900.
L. A. ASPINWALL.
BEEHIVE.
(Application filed Dec. 16, 1899.)
(No Model.) 2 Sheets—Sheet 1.
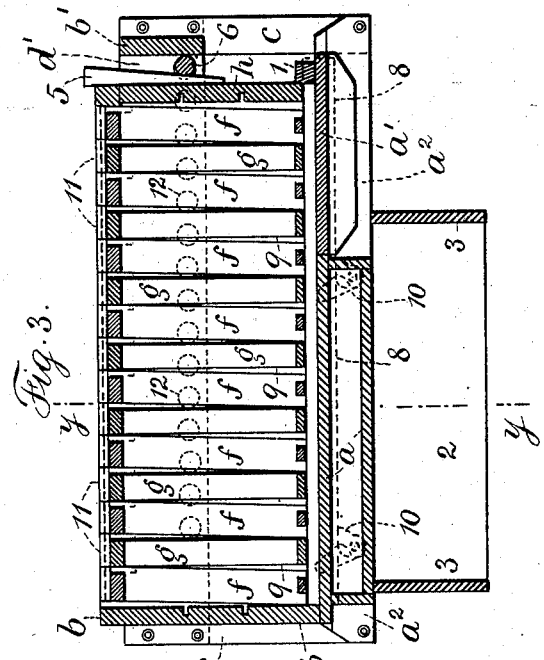
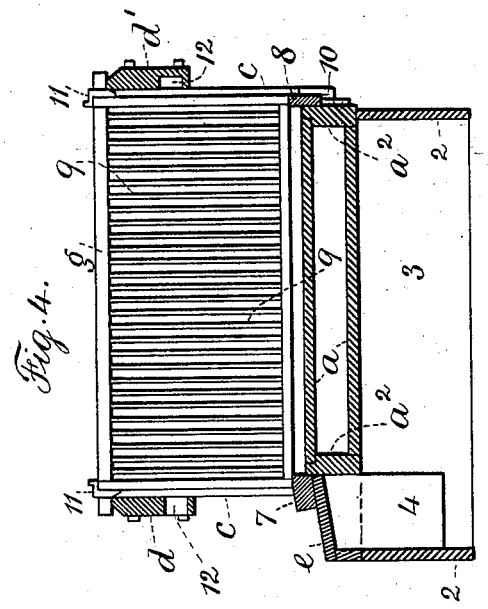
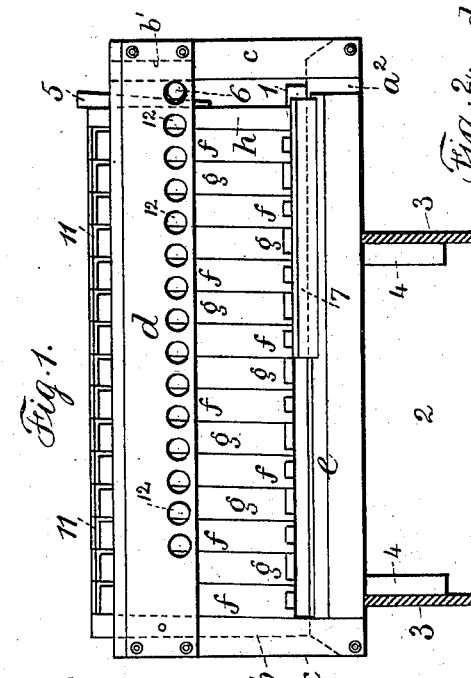
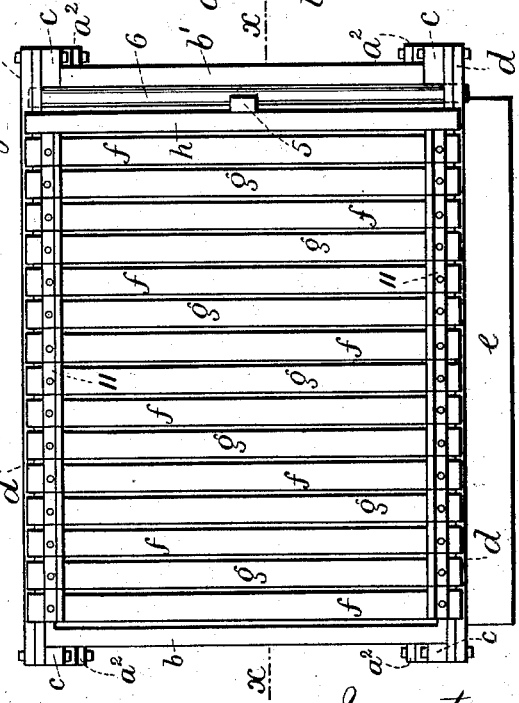
Witnesses:
J. Staib
Chas. H. Smith
Inventor:
Lewis A. Aspinwall
per L. W. Serrell & Son
attys.
THE NORRIS PETERS CO., PHOTO-LITHO., WASHINGTON, D. C.

No. 653,331. Patented July 10, 1900.
L. A. ASPINWALL.
BEEHIVE.
(Application filed Dec. 16, 1899.)
(No Model.) 2 Sheets—Sheet 2.
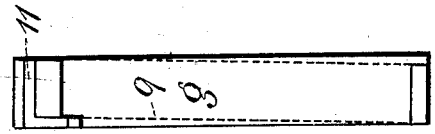
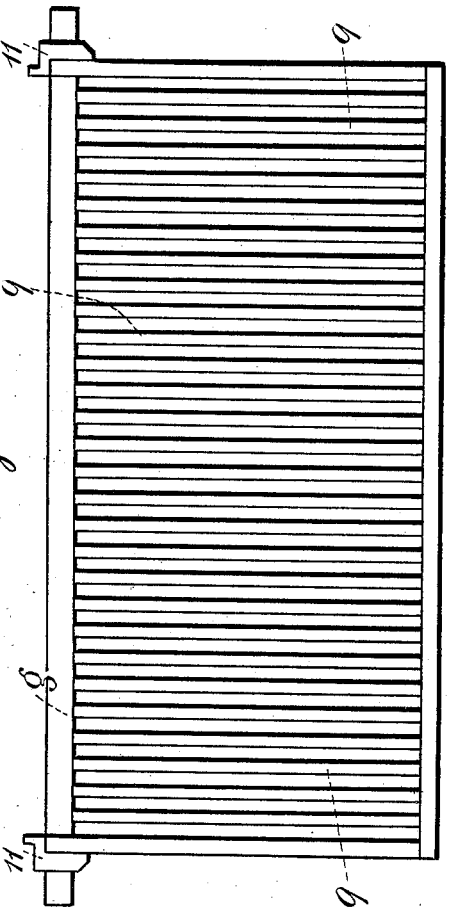
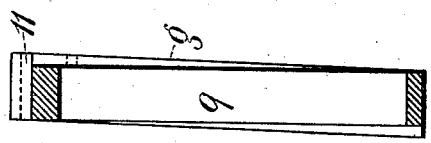
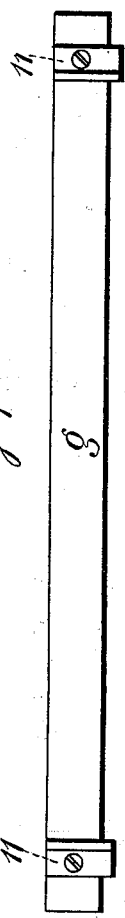
Witnesses:
J. C. Staib
Geo. T. Pinckney
Inventor:
Lewis A. Aspinwall
per L. W. Serrell & Son Attys.

UNITED STATES PATENT OFFICE.

LEWIS AUGUSTUS ASPINWALL, OF JACKSON, MICHIGAN, ASSIGNOR TO THE ASPINWALL MANUFACTURING COMPANY, OF SAME PLACE.

BEEHIVE.

SPECIFICATION forming part of Letters Patent No. 653,331, dated July 10, 1900.

Application filed December 16, 1899. Serial No. 740,528. (No model.)

*To all whom it may concern:*

Be it known that I, LEWIS AUGUSTUS ASPINWALL, a citizen of the United States, residing at Jackson, in the county of Jackson and State of Michigan, have invented a new and useful Improvement in Beehives, of which the following is a specification.

My present invention is in part an improvement upon the device covered in my former patent, No. 493,466, granted March 14, 1893; and the present invention is especially designed to prevent the swarming of the bees by providing increased quarters proportionate to the necessities of increase in the number of bees.

In my former patent the brood or comb frames were made with inclined end pieces providing for the moving in or out of the said frames, as filled with comb, in such a manner as not to injure or kill the bees. In my present hive I employ similar brood or comb frames, and I prefer to arrange the same alternately with dummy frames that are filled in with a series of similar or parallel strips or slats. These slats may be placed in any desired direction and so close to one another as to leave between them about a bee-space, and the slats are preferably as wide as the dummy frames, and they are so close as to prevent the bees building comb in the frames, but yet at the same time allowing room for the bees to travel through the dummy frames from one comb-frame to the next and in this way providing ample room for all the bees and for the increase of the bees, so as to overcome the tendency of the bees to swarm at certain periods.

The hive-frame is made of maximum capacity, or, in other words, of a capacity that is made necessary at the swarming time, and the framework of the hive is bolted together, so as to be readily taken apart in knockdown form for shipment, and in connection with these series of brood or comb frames and dummy frames I employ an auxiliary bottom to the hive and perforated side bars receiving a cross-bar, and I employ a wedge between the cross-bar and the series of frames, so as to hold the same tightly together.

In the drawings, Figure 1 is an elevation partially in section, and Fig. 2 a plan view, representing my improvement. Fig. 3 is a longitudinal section through the hive at *x x* of Fig. 2; Fig. 4, a cross-section at *y y* of Fig. 3, in which figure an elevation is shown of one of the dummy frames. Fig. 5 is an elevation of one of the dummy frames separately. Fig. 6 is a vertical section, Fig. 7 an end elevation, Fig. 8 a horizontal section, and Fig. 9 a plan, of the same.

The foundation or support for the hive is preferably composed of sides 2 and ends 3. The hive preferably is provided with a double bottom *a*, extending longitudinally for about half the distance of the frame, the purpose of which is to be filled with sawdust or similar suitable material as a non-conductor to provide warmth for the hive during winter. The ends *b b'* and the corner-pieces *c* are connected together and to the bottom of the hive, and the side bars *d d'* extend lengthwise of the hive between the ends *b b'*, and above the bottom of the hive the side bars are perforated, and the various parts are connected together by bolts instead of by nails, thus making a knockdown hive for shipment, or, in other words, one that can be readily taken apart and conveniently packed.

The alighting-board *e* and the uprights 4 are connected together, and the entrance-closing block 7 is separate, and said parts come longitudinally at one side of the hive, and the alighting-board rests upon the sides or ends of the foundation, and the uprights 4 pass in between the ends 3 of the support. I provide a rear closing-slat 8 along the opposite side of the hive, and between the double bottom *a* and the end of the frame is a movable auxiliary bottom board *a'*, resting on the longitudinal sides and employed only when the hive is filled with the series of brood or dummy frames to its maximum capacity, and upon this bottom board *a'* there is a removable strip 1, acting as a closing-block to the lower edge of the hollow board *h*. The brood or comb frames *f* I make preferably with inclined end pieces, as in my aforesaid patent and as will be seen especially by reference to Fig. 3, the construction of which does not require further description. These are open frames, which the bees fill with comb in the honey-making season. Between these brood or comb frames $f$ are the dummy frames $g$, and these dummy frames are made with a series of equidistant similar or parallel slats 9, placed close together and of approximately equal distances apart, the slats being in cross-section preferably of the width of the frames. These slats may be placed vertical, horizontal, or diagonal in either direction, and they may be straight or undulating, the said forms being immaterial so long as the slats are approximately parallel or close together, so that between them there is about a bee-space, and the frames $g$ are filled with the slats. The brood or comb frames $f$ and the dummy frames $g$ are placed alternately the length of the hive prior to the swarming period. These dummies may also be constructed and adapted for use among other styles of frames. At other times the hive may contain only approximately one-half the number of frames and be increased to the maximum by the addition of other frames prior to the swarming period.

The side bars $d\ d'$ being perforated or recessed at 12, I provide a cross-bar 6, preferably round in form, extending across the side bars through the perforations therein and adjustable lengthwise of the side bars according to the number of frames in the hive, and back of the frames I place a follow-board $h$, preferably scored, as shown in Fig. 3, to prevent warping, and I employ a wedge 5 between the cross-bar 6 and the follow-board, so as to compact the series of brood and dummy frames and hold them securely in place. I prefer to perforate the side bar $d$ and to recess the inner face of the side bar $d'$, as shown in the cross-section view, Fig. 4, as in this manner it is easier to retain the cross-bar 6 in place.

In connection with the rear closing-slat 8 I employ buttons 10 on the rear portion of the hive to retain said closing-slat in place. The closing-slat 8 fills the space between the bottom of the frames and the top of the double bottom $a$ along the rear of the hive, and the closing-block 7 extends part way along the front of the hive upon the alighting-board $e$, as will be seen by reference to Fig. 1, so that for a distance beneath the said dummy or comb frames and above the alighting-board there is a space through which the bees pass to and from the frames, closing-blocks being necessary to contract the entrance, it being evident from Fig. 3 that the bees can pass up from below into the said frames.

I prefer to place over the series of brood and dummy frames a cover of any suitable description and to place metal angle-pieces or corners 11 upon the upper portions of the respective frames, as in my former patent.

I claim as my invention—

1. In a beehive, the combination with the open brood or comb frames, of dummy frames intermediate and alternating with the comb-frames and of approximately-equal area and having substantially closely-spaced-apart equidistant parallel slats filling and forming part of the said dummy frames, substantially as set forth.

2. In a beehive, the combination with the support, the bottom and end and corner plates, of the perforated side bars, a cross-bar, a wedge and a closing-board and a series of frames held in place by the closing-board, the wedge and the cross-bar, substantially as set forth.

3. In a beehive, the combination with a supporting-frame, of a hive-body composed of a double bottom, end and crossing pieces, and bolts for securing the same together, a series of frames within the hive, an alighting-board and an entrance-block thereon extending part way of the length of the hive, and a closing-slat on the back side of the hive extending the full length thereof, and means, substantially as specified, for holding the series of frames compactly together, substantially as set forth.

4. In a beehive, the combination with a supporting-frame, of a hive-body composed of a double bottom, end and crossing pieces and bolts for securing the same together, a series of frames within the hive, an alighting-board and a slat thereon extending part way of the length of the hive and a closing-slat on the rear side of the hive extending the full length thereof, side bars extending across between the ends and perforated, and a cross-bar in the perforations of the side bars, a follow-board coming at one end of the series of frames, and a wedge between the follow-board and the cross-bar for compacting the series of frames and holding them in place, substantially as set forth.

5. In a beehive, the combination with a supporting-frame, of a hive-body composed of a double bottom, end, and cross pieces and bolts for securing the same together, a series of frames within the hive, an alighting-board and an entrance-block thereon extending part way of the length of the hive, and a closing-slat on the rear side of the hive extending the full length thereof, and means substantially as specified, for holding the series of frames compactly together, and an auxiliary bottom at one end of the frame, the same coming beneath the series of frames when the hive is filled to its maximum capacity, and a removable strip thereon, substantially as set forth.

6. In a beehive, the combination with the support and the body, of a series of brood or comb frames and a series of dummy frames interchangeable with the brood or comb frames and adapted to be placed alternately therewith in the hive, said dummy frames being filled with series of approximately-parallel or closely-placed slats whereby space is provided for the bees between the brood or comb frames to obviate the tendency of swarming, substantially as set forth.

7. In a beehive, the combination with the ends and the perforated side bars, of a series of open brood or comb frames and a series of dummy frames made with closely-spaced-apart filling-slats, the dummy frames being interchangeable with the brood or comb frames and adapted to be placed alternately therewith in the hive, the said frames being located between and supported upon the side bars, and means for holding the said frames closely together regardless of the number of frames in the hive, substantially as specified.

Signed by me this 8th day of December, 1899.

LEWIS AUGUSTUS ASPINWALL.

Witnesses:
  E. L. ROSE,
  DANIEL H. PERRY.